Nov. 2, 1965     C. BRIERLEY     3,214,856

EARTAGS

Original Filed Sept. 15, 1960

INVENTOR

Cuthbert Brierley

BY Mawhinney & Mawhinney

ATTORNEY 3,214,856
EARTAGS
Cuthbert Brierley, Park House, Henley-on-
Thames, England
Continuation of application Ser. No. 56,130, Sept. 15,
1960. This application Mar. 19, 1965, Ser. No. 440,198
1 Claim. (Cl. 40—301)

The present invention is a continuation of my similarly entitled copending application, Ser. No. 56,130, filed Sept. 15, 1960.

This invention relates to an animal identification tag for fitting through a hole in a part of the animal.

The term animal is to be taken to include not only livestock such as cattle, sheep and pigs but also birds and fish.

Where cattle, sheep and pigs are concerned a tag according to the present invention is intended for attachment to one of the animal's ear flaps.

With a bird however, the tag may be attached to a membrane of the wing, and with a fish, to the base of the tail.

The main desiderata for an animal identification tag are that it should be lasting and weatherproof, that only a small hole be required to fit it to the animal, that once fitted it shall be irremovably attached to the animal so as to be more or less tamperproof or incapable of being pulled out, and that its character should be such that it does not apply pressure to the animal's flesh and such that it may not easily become entangled by the animal in natural or artificial hazards in such a manner to either to trap the animal or cause the animal to injure itself in its struggles to get free. It is also a great advantage if it is capable of being fitted in a single operation without first punching a hole in the part of the animal to which it is to be attached.

Further desirable features are that it shall be light in weight, so as, in the case of an ear tag, not to cause droop of the ear flap, and that it shall be capable of manufacture in various colors which cannot fade or wear off whereby not only may individual animals be identified, for example by numbers and/or letters or some other code embossed, engraved or other wise marked or stamped on the tags, but also groups of animals by attaching to each animal of the group a tag of the same color.

According to the present invention there is provided an animal identification tag comprising a pair of tabs to lie flat one on each side of the part of the animal to which the tag is to be attached, one of the tabs having an upstanding headed spike to pass through the part of the animal to which the tag is to be attached, and the other of the tabs having a hole to receive the spike with the head of the spike entered through the hole and preventing the withdrawal of the spike from the hole, the spike on the one tab and the hole in the other tab being offset from the center of the tab towards one edge thereof to an extent such that the tabs swing round with the spike as an axis to disengage entanglements.

Preferably, the tabs are elongated, and the spike and the hole respectively are formed towards one end of the tabs.

An identification tag according to the invention may be constructed so as to meet most if not all of the above mentioned requirements for animal identification tags as will hereinafter be made clear.

It is to be understood that in use, the tabs are joined only by the spike, which in the case of an ear tag, passes through the ear flap and the hole in the other tab, the spike being retained in the hole by the head of the spike.

By having separate tabs joined only by the spike, each tab may lie wholely within the periphery of the ear flap and there is then no projecting part or loop to become entangled. Furthermore the tag may be attached to any position on the ear without the risk of leaving insufficient room for the ear to grow thereby causing the ear to curl.

Also, and what is most important, because the spike and the hole respectively are offset from the center of the tabs to an extent such that the tabs are able to swing round to disengage entanglements a tag according to the invention is far less likely to trap the animal or cause it to injure itself in its struggle to get free.

Furthermore, with the preferred construction in which the tabs are elongated with the hole and the spike towards one end, the tabs are more easily able to swing round or deflect to disengage any entanglement which finds its way beneath them.

To assist this disentanglement the inner faces of the tabs may, according to a feature of the present invention, be chamfered, away from the spike on the one tab and the hole in the other tab respectively.

By making the distance between the two tabs in the assembled condition sufficiently large in relation to the thickness of the ear to which the tag is to be attached, it is possible to ensure that the flesh of the ear is not subjected to pressure and that diseases due to pressure or lack of circulation of air are avoided. In the preferred form of the invention this is done by making the tab with the hole a loose sliding fit on the shank of the spike and making the shank of sufficient length.

The tags according to the invention are preferably made of a synthetic plastic material having the characteristics hereinafter defined. By the use of such material, the tags may be produced as relatively light moldings and so as to bear in intaglio or relief any desired number, symbol, or code. Furthermore the plastic material may include any convenient coloring agent which then imparts a color to the tags which cannot fade or wear off.

Preferably also, the spike is sharp pointed so as to be able to penetrate more easily the part of the animal to which the tag is to be attached when forced in by suitably designed pliers.

In this connection also, the head of the spike on the one tab and the hole in the other tab are preferably so formed as to co-operate to punch, during attachment of the tag to the animal, a hole for the spike in the part of the animal to which the tag is attached.

By way of specific example only, an ear tag according to the present invention will now be described with reference to the drawings accompanying the provisional specification in which.

Figure 1:
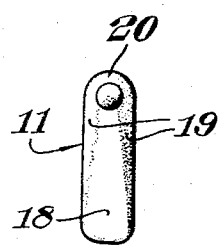
FIGURES 1 and 2 show the spike bearing tab in front and side elevations respectively.
Figure 2:
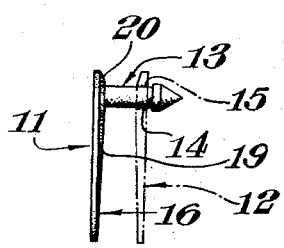
Figure 3:
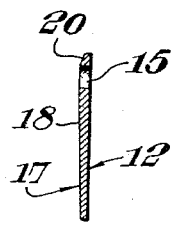
FIGURE 3 is a cross section of the other tab.

Referring to the drawings, the tabs, indicated respectively by the reference numerals 11 and 12, are of generally elongated rectangular shape, molded from nylon. The tab 11 has an integrally molded upstanding spike 13 towards one end i.e. offset from the center of the tab, and the end of the tab adjacent the spike is rounded off concentrically with the spike. The spike, as shown, includes a shank 13a and an enlarged head 13b. The head of the spike is sharp pointed having a conic portion 13c surrounding a cylindrical portion 13d as shown.

The cylindrical portion provides a shoulder 14 on the spike the purpose of which is hereinafter described, and a sharply defined edge 13e is provided between the cylindrical portion and the conic portion the purpose of which is also hereinafter described.

The tab 12 is of corresponding size and shape to the tab 11 and has a hole 15 in the same relative position as the spike 13 to receive the spike with the head of the spike entered through the hole. The hole 15 is dimensioned so as to be a loose sliding fit on the shank of the spike which is cylindrical in shape and, in the present example, a little over one eighth of an inch in diameter, the hole 15 being sharp edged at 15a on the inner face 17 of the tab 12.

Figure 4:
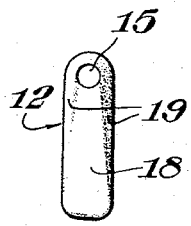
FIGURE 4 is a front elevation of the other tab.

The inner faces 16, 17 of both tabs are chamfered away from the spike and the hole respectively in all directions. Thus referring to FIGURES 1 and 4, there is a chamfered surface 18 extending from the spike and the hole respectively in the directions towards the farther end (the lower end in the drawing) of the tabs, and chamfered surfaces 19 extending from the spike and the hole respectively in the directions towards the side edges of the tabs, the surfaces 19 being joined around the spike and the hole respectively on the side adjacent the nearer end of the tabs by a frusto-conically chamfered surface 20.

The farther ends of the tabs have rounded corners and the edges of the tabs are rounded from front to back as shown.

A suitable pair of pliers of any convenient construction is used to attach the tag to an ear flap. The pliers grip the tabs and force them towards one another, the tabs being so located by the pliers relatively to one another that, after penetrating the ear, the head of the spike 13 is forced through the hole 15. The shoulder 14 then prevents withdrawal of the spike from the hole.

As the spike is forced through the ear flap, which is backed by the tab 12, the edge defined between the cylindrical and conic portions of the head of the spike 13 and the facing edge 15a of the hole 15 cooperate to punch a hole in the ear flap. Thus by shearing action between the edges referred to, a disc of flesh is actually punched out of the ear flap and a clean hole is formed in the ear flap to receive the spike. In this way bleeding of the ear flap is reduced.

The tabs are assembled with the inner faces 16 and 17 of the tabs lying flat one on each side of the ear.

The shank of the spike 13 is made long enough to ensure that the ear flap is not held compressed between the tabs and, since the one tab is a loose fit on the spike, both tabs may more easily swing round with the spike as an axis to disengage entanglements finding their way between the tabs and the ear flap, the one tab turning on the spike and the spike turning in the hole in the ear flap.

In the present example the shank of the spike is 3/8 inch long but this length may obviously be varied depending upon the application to which the tags are to be put.

Compression of the ear flap between the tabs is to be avoided as this can of itself or by exclusion of the free circulation of air cause disease of the ear flap.

It is preferable for the hole in the one tab to be a loose sliding fit on the shank of the spike because this simple arrangement both ensures that the two tabs do not apply pressure to the flesh between them and that each of the tabs can swing round independently of the other to disengage itself from entanglements. Other arrangements can be used provided that they prevent the tabs applying pressure to the flesh between them. However, arrangements in which the two tabs cannot swing independently of each other are considered less effective for disengaging from entanglements.

The nylon used to make the tag is of any desired color, and one or both tabs 11 and 12 may bear on their outer face in intaglio or relief molded letters or numbers.

The nylon used has the following characteristics and these characteristics (hereinafter referred to as the characteristics herein defined) are those which any other synthetic plastic material to be used should possess:

It is sufficiently hard to give to the spike 13 the rigidity necessary to force it through the ear flap and the hole in the other tab using a suitably designed pair of pliers and to prevent the withdrawal of the head of the spike through the hole 15 in the tab 12 once entered therethrough. On the other hand, it is sufficiently flexible to permit the head of the spike to be forced through the hole and sufficiently free from brittleness to allow the tabs to bend, at least to a substantial degree, without snapping. It is not essential to use the same material for both tabs but if different ones are used, their mutual characteristics must be such as to satisfy the above requirements.

An ear tag as above described with reference to the drawings accompanying the present specification meets all of the requirements described in the fifth and sixth paragraphs of this specification. Furthermore, where used on sheep, since the tabs are able to swing round, the possibility of the tags being fouled by shearing cutters is reduced.

The device as described may be used as an identification tag not only for cattle, sheep and pigs but also for fish and birds, in which requirements similar to those described for ear tags also apply.

Where fish are concerned the tag is attached at the base of the tail of the fish, and with birds the tag is attached to a wing membrane.

In the particular arrangement described with reference to the accompanying drawings the spike 13 is at the end of tab 11 and hole 15 of the tab 12 is correspondingly disposed. This is preferred but not essential and the spike 13 and hole 15 may be somewhat in from the end of their respective tabs provided that the spike and the hole are offset from the center of the tab to such an extent as to ensure that the tabs can swing round to disengage entanglement as discussed above.

While tabs of rectangular shape are preferred they may be of other shapes. Thus, they may be oval with the spike and hole towards one end of the tabs or they may be circular discs with the spike and hole near the edge. It will be seen that in the circumstances also the spike and hole are offset from the center of the tab.

Although I have disclosed herein the best forms of the invention known to me at this time, I reserve the right to all such modifications and changes as may come within the scope of the following claim.

What is claimed is:

An animal identification tag comprising a relatively thin elongated planar base tab, a spike on said base tab comprising a shank extended at substantially right angles from the flat planar surface from said base tab, said shank having a cylindrical bearing surface at least at the outer portion from said base tab, a head on the outer portion of said shank offset outwardly from the cylindrical bearing surface, said head being of substantially greater diameter than the cylindrical portion of the shank and having a shoulder at the outer portion of the cylindrical bearing surface extended at substantially right angles to the axis of the shank, a pointed impaling member at the outer portion of the head for piercing the portion of the animal to be tagged, said impaling member having a pointed end and a conical body enlarging from the point to the shoulder, and an elongated relatively thin planar front tab, said front tab having an opening therethrough proximate one end thereof, the diameter of the opening being less than the diameter of said shoulder, the front tab at least about said opening being resilient to permit said wall to be forced over said impaling member and shoulder and to spring back behind the shoulder in interlocking engagement, said opening in the unsprung condition being circular and of greater diameter than the external diameter of said shank to permit relative sliding and swivel movement between said tabs, said shank being centrally offset relative to the center of said base tab proximately one end thereof, the length of said shank from said base tab to said head being of a length to ensure that the part of the animal to which it is attached is not compressed between the tabs, the edges of the opposed faces of said tabs being chamfered and said tabs being longer in length than in width so that the front and base tabs will have free relative rotational movement about the axis of said offset shank to free the tabs from entanglement with fixed foreign matter or such obstruction as wire fences.

References Cited by the Examiner

UNITED STATES PATENTS

| | | | |
|---|---|---|---|
| 915,355 | 3/09 | Jackson | 40—301 |
| 1,374,443 | 4/21 | Giordano | 40—301 |
| 2,940,199 | 6/60 | Goldberg | 40—301 |

FOREIGN PATENTS

| | | |
|---|---|---|
| 15,055 | 9/92 | Great Britain. |

EUGENE R. CAPOZIO, *Primary Examiner.*
WENCELSO J. CONTRERAS, *Examiner.*